United States Patent [19]

Freeman

[11] Patent Number: 4,598,562

[45] Date of Patent: Jul. 8, 1986

[54] STEERING COLUMN PROTECTIVE JACKET

[76] Inventor: John T. Freeman, 36250 Hazelwood, Westland, Mich. 48124

[21] Appl. No.: 492,605

[22] Filed: May 9, 1983

[51] Int. Cl.⁴ .............................................. E05B 65/12
[52] U.S. Cl. ......................................... 70/237; 70/417
[58] Field of Search ................... 70/428, 417, 237, 247

[56] References Cited

U.S. PATENT DOCUMENTS

| D. 227,547 | 7/1973 | Bodan | D8/113 |
|---|---|---|---|
| 1,956,438 | 4/1934 | Eichenauer | 70/428 X |
| 3,811,303 | 5/1974 | Robertson | 70/237 |
| 4,020,662 | 5/1977 | Fowler | 70/428 X |
| 4,074,550 | 2/1978 | Rowlings | 70/428 X |
| 4,167,222 | 9/1979 | El Bindari | 70/237 X |
| 4,442,688 | 4/1984 | Saegusa | 70/252 |

Primary Examiner—Robert L. Wolfe
Attorney, Agent, or Firm—Charles W. Chandler

[57] ABSTRACT

A protective jacket is disclosed for the steering column of an automotive vehicle of the type in which a breakable cover encloses an internally mounted steering wheel locking means, and has ignition key means mounted on the opposite side of the turn signal lever. The jacket includes a pair of jacket members hinged together so that they can be readily mounted on the steering wheel column. A padlock connects the two members together so that the protective jacket can be removed when the vehicle is sold, however, it normally is locked in position permitting the user to operate both the ignition system as well as the turn signal lever.

3 Claims, 5 Drawing Figures

STEERING COLUMN PROTECTIVE JACKET

BACKGROUND OF THE INVENTION

This invention is related to vehicle anti-theft devices, and more particularly to a removable protective jacket for enclosing those components mounted adjacent the ignition key housing in an automotive steering column.

In recent years, many attempts have been devised for preventing the theft of automotive vehicles. For a period of time, many vehicles were stolen because the thieves could readily pull out the ignition key cylinder and start the car. To combat this problem, some inventors devised a jacket that mounted on the steering column with a housing that enclosed the ignition key housing to prevent anyone from removing the ignition key cylinder. However, the housing for the ignition key cylinder had to be removed by the user before he could operate the vehicle. Frequently, it would be too much effort for him to continually mount and then remove the housing so that he eventually discontinued using the protective portion of the jacket.

Other forms of protective jackets enabled the user to insert his key into the ignition switch, but prevented forceable removal of the ignition key cylinder.

In recent years, automotive manufacturers have devised an ignition key cylinder that is extremely difficult to remove. Thieves have gotten around this problem by breaking the cover around that portion of the steering column adjacent the turn signal lever. This cover is formed of a plastic that can be readily broken in order to gain access into the steering column. In this portion of the steering column, a spring-loaded plunger is mounted for engaging the steering wheel lock. This can be easily retracted once the cover was broken. In other cases the ignition circuit can be readily activated.

One solution to this problem was disclosed in U.S. Pat. No. 4,167,222 which issued to Ahmed El Bindari on Sept. 11, 1979, and comprised an armored jacket permanently mounted about the steering column.

SUMMARY OF THE INVENTION

The broad purpose of the present invention is to provide a removable jacket formed of a pair of halves hingedly mounted around an automotive steering column. The two jacket halves are locked together with a padlock so that the user can remove the jacket when he sells the vehicle. The jacket has a large opening fully exposing the ignition key housing so that it does not interfere with the normal operation of the ignition key.

The preferred jacket also has an opening for the turn signal lever so that it can be freely operated.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
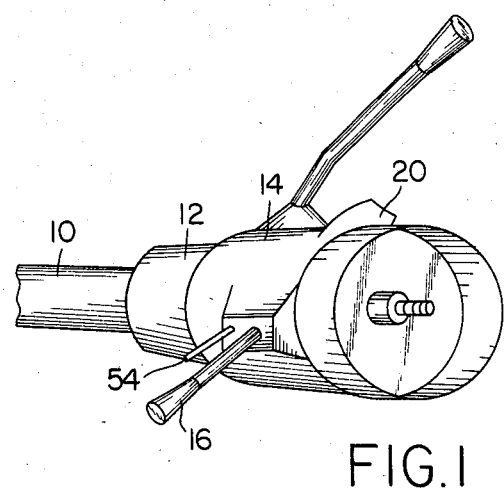
FIG. 1 is a view of a conventional steering column with the steering wheel removed.

Referring to the drawing, FIG. 1 illustrates a conventional steering column 10 for supporting a steering wheel, not shown. A bowl 12 and a cover 14 enclose internal components of the steering wheel including a locking device which prevents the steering wheel from being turned unless the ignition key means has been appropriately activated.

Turn signal 16 is mounted on one side of housing 10, extending through an opening in the housing. Ignition key housing 20 is mounted on the opposite side of the housing.

Bowl 12 and cover 14 are formed of a plastic that can be readily broken by a thief rapping the cover with a hammer or other similar tool.

Figure 2:
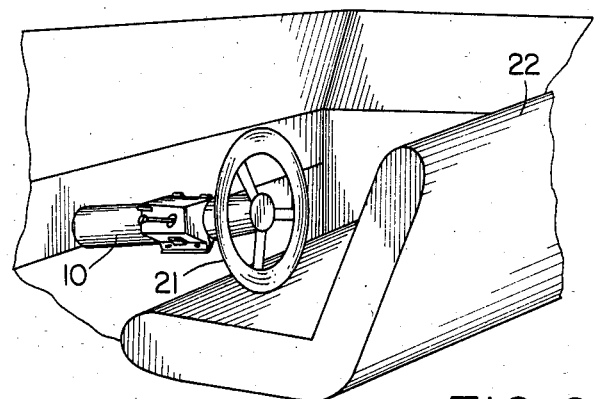
FIG. 2 is a view similar to FIG. 1 but showing the preferred jacket mounted on the steering column.

Referring to FIG. 2, a conventional steering wheel 21 is mounted on the upper end of column 10 within vehicle 22. A protective jacket, generally indicated at 24, is mounted on steering column 10. The jacket includes: a jacket member 26 and a housing member 28. Jacket member 26 has a generally semicircular configuration accommodating the cylindrical curvature of housing 14. The jacket member has a relatively large opening 30 for receiving ignition key housing 20 to a fully exposed position so that the user can freely manipulate the ignition key in the ignition key housing without interference from the jacket. A flange 32 is carried along one side of the jacket. The flange has a plurality of openings 34.

Figure 3:
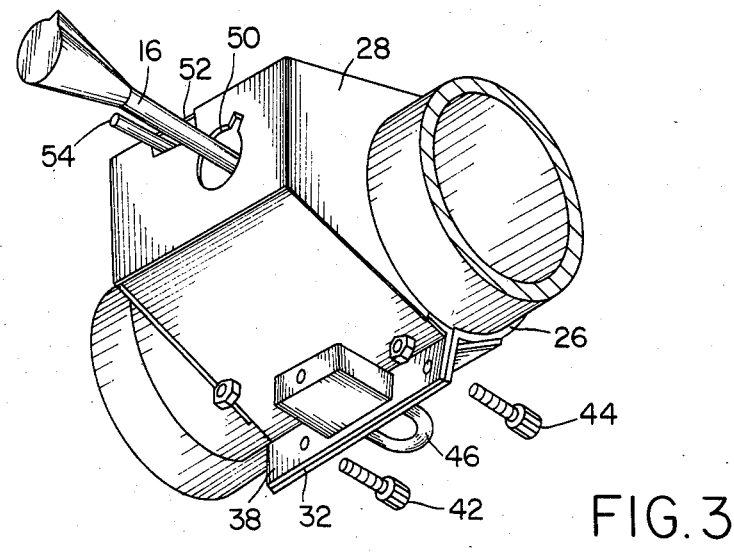
FIG. 3 is an enlarged, partially exploded view of the preferred steering column jacket.
Figure 4:
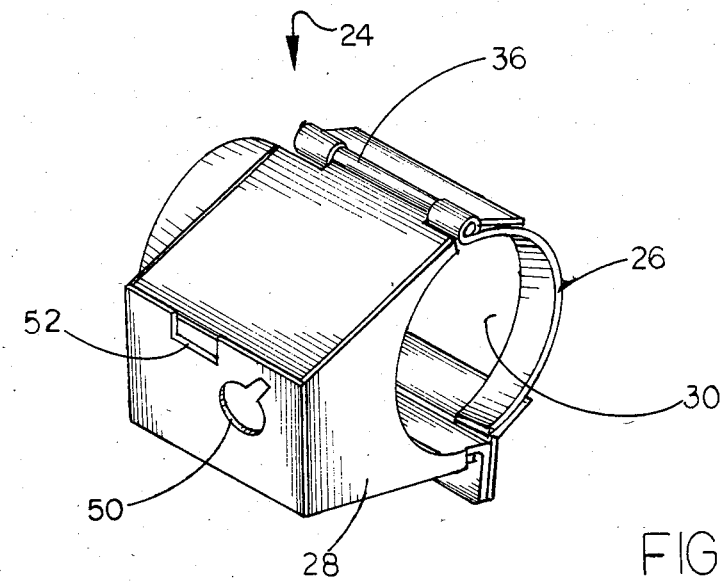
FIG. 4 is a view similar to FIG. 3 but with the jacket removed from the steering column.
Figure 5:
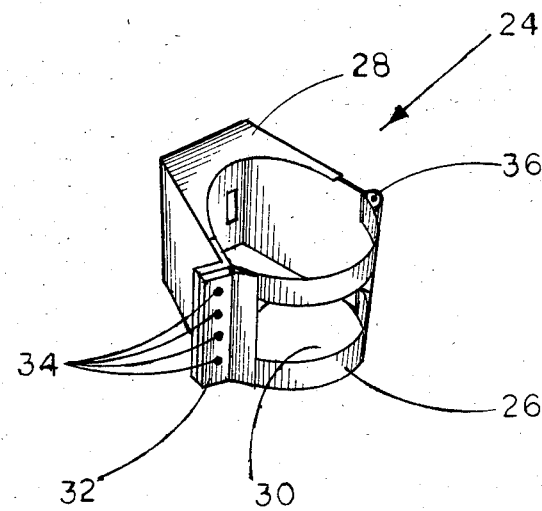
FIG. 5 is another view of the protective jacket.

Jacket housing 28 forms an enclosure for the turn signal housing. Hinge means 36 connect one side of housing 28 to the side of jacket member 26 opposite flange 32, so that the two members can be moved between open and closed positions. In their closed position, flange 38 carried on housing 28 is disposed adjacent flange 32 of the jacket member. Referring to FIG. 3, flange 38 has a series of opening means 40. Fastener means 42 and 44 are received in the outermost pair of openings for locking the jacket to the housing. A padlock 46 has it shackle received in the inner pair of openings to lock the jacket member and the housing member together.

Housing 28 has an opening 50 through which turn signal lever 16 is disposed. The housing also has a second opening 52 through which tilt control lever 54 is disposed so that these two levers can be freely manipulated by the user without interference from the protective jacket. It is to be noted that the length of the protective jacket corresponds to the length of steering column cover 12, so that it fully encloses and protects that portion of cover 12 adjacent the turn signal lever. It is this portion of the turn signal housing that is most vulnerable to thieves.

In use, the user mounts the housing on the steering column by passing the turn signal lever and the tilt control lever through the appropriate openings in the housing. He then closes jacket member 26 to its closed position while passing the ignition housing through opening 30. When the two flanges 32 and 38 are side-by-side, he padlocks the two halves together. The device then remains in position until the user wants to remove it as for example when he sells his car and wants to transfer it to another car.

Having described my invention, I claim:

1. In a vehicle, the combination comprising:

a steering column;

an ignition key housing having a generally tubular wall with an ignition key opening in the end thereof, mounted on one side of the steering column;

a turn signal lever mounted on the opposite side of the steering column;

steering column cover means mounted on the steering column adjacent the turn signal lever and the ignition key housing;

a generally semi-cylindrical jacket member removably mounted on the steering column cover means, the jacket member having a length at least as long as the length of the steering column cover means, the jacket member having an opening for passing substantially the entire tubular wall of the ignition key housing therethrough to an unenclosed position permitting manipulation of the ignition switch by a key;

a protective housing having an opening receiving the turn signal lever therethrough;

the protective housing and the jacket member having a first pair of adjacent side edges;

hinge means connecting the first pair of adjacent side edges such that the jacket member is pivotal with respect to the protective housing between an open position in which the protective housing and the jacket member may be removed from the steering column cover means, and a closed position in which the protective housing and the jacket member receive the turn signal lever and the ignition key housing through their respective openings;

the protective housing and the jacket member having a second pair of adjacent side edges;

means releasably connecting together the second pair of adjacent side edges of the jacket member and the protective housing;

whereby the jacket member and the protective housing protect the steering column cover means and steering wheel locking components mounted within the steering column cover means, but permit the user to insert and operate the ignition key mechanism without removing the jacket member and the protective housing from the steering column cover means.

2. Means as defined in claim 1 in which the second pair of adjacent side edges of the jacket member and the protective housing have a pair of flanges disposed side-by-side when the jacket member and the protective housing are in said closed position, and including a key operated device connecting said flanges together.

3. Means as defined in claim 2, in which the key operated device comprises a padlock.

* * * * *